J. ESTES.
HARVESTER.
APPLICATION FILED JULY 10, 1908.
963,128.
Patented July 5, 1910.
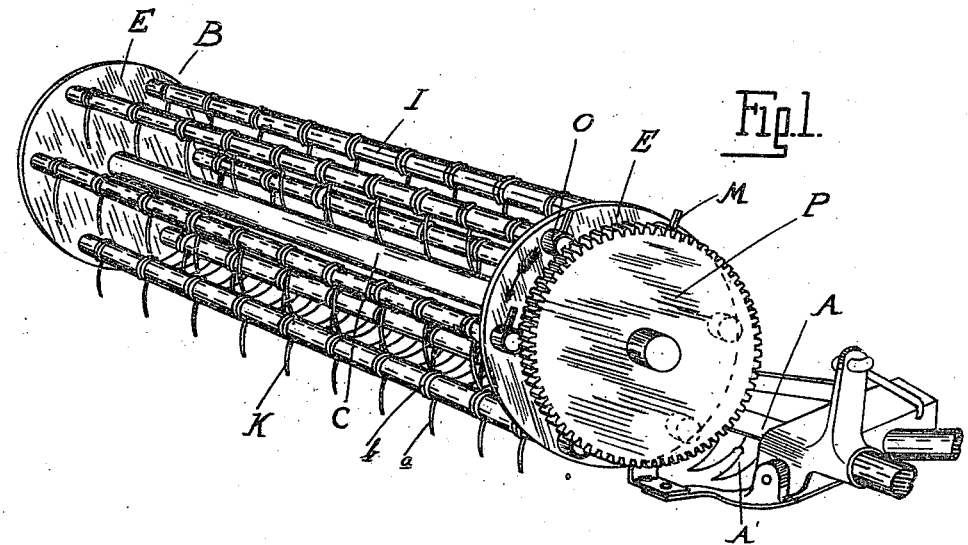
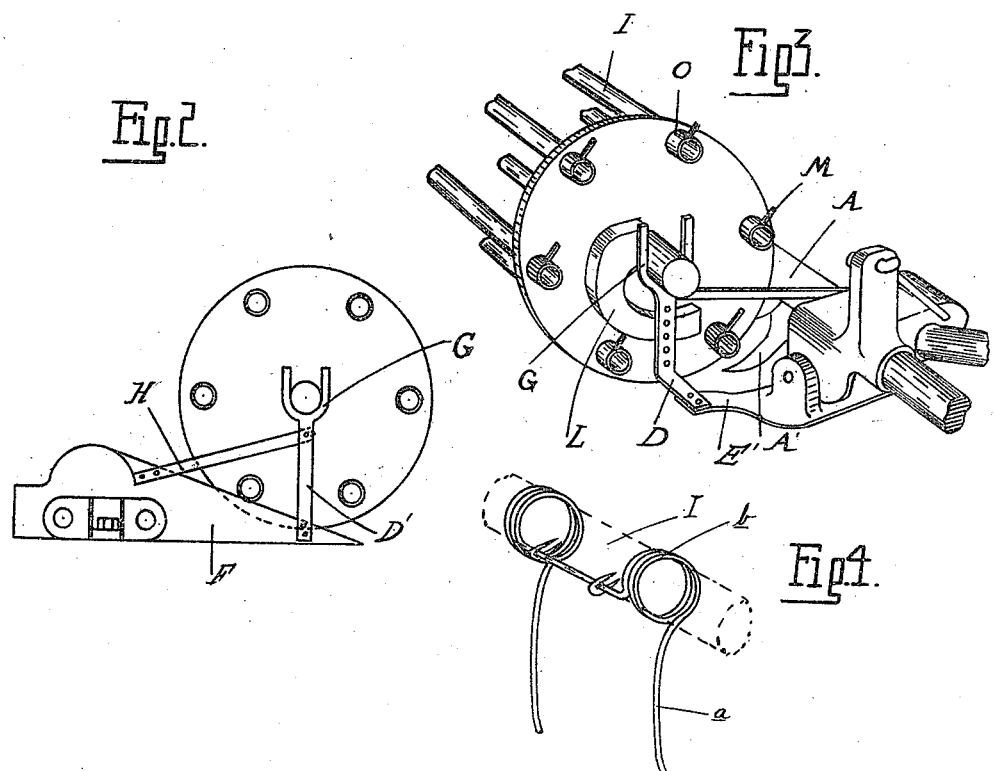
Witnesses
W. K. Ford
N. J. Belknap
Inventor
Job. Estes
By Whitman, Hulbert & Whitman
Atty's

UNITED STATES PATENT OFFICE.

JOB ESTES, OF ALGER, MICHIGAN.

HARVESTER.

963,128.  Specification of Letters Patent.  Patented July 5, 1910.

Application filed July 10, 1908. Serial No. 442,945.

*To all whom it may concern:*

Be it known that I, JOB ESTES, a citizen of the United States of America, residing at Alger, in the county of Arenac and State of Michigan, have invented certain new and useful Improvements in Harvesters, of which the following is a specification, reference being had therein to the accompanying drawings.

The invention relates particularly to a bean or pea harvester, and consists primarily in mechanism of this character comprising means for elevating the vines in advance of the cutter, so that the former may be severed near to the ground and the crop uninjured.

The invention further consists in the novel construction of the gathering and elevating mechanism, and still further in details of construction as will be more fully hereinafter pointed out.

In the drawings,—Figure 1 is a perspective view of the gathering mechanism associated with the usual cutter bar of a mowing machine; Fig. 2 is an end elevation, showing particularly the support for the reel or drum; Fig. 3 is a detached perspective view illustrating the tripping mechanism; and Fig. 4 is a detached perspective view, illustrating the peculiar form of teeth and means of connection to the bar on which they are carried.

In the drawings thus briefly described, A represents the usual finger bar of a mower, associated with the ordinary cutter A'.

B is a drum or reel, consisting of a center or main shaft C, and ends or heads E and E, mounted in advance and above the finger bar, as shown. It is preferably supported by means of uprights, as D, D', fastened respectively to a shoe, as E', at one end of the finger bar, and the usual track cleaner F at the opposite end (Fig. 2). The free ends of the uprights are forked, as at G, to provide vertical bearings for the shaft C, the bearings being so fashioned that the shaft may move vertically therein, permitting the drum to rise in passing over obstacles, and thus prevent the breakage of the teeth. The uprights referred to are preferably reinforced by brace rods, as H.

Journaled in the drum or reel heads are a series of longitudinal bars I mounted for free rotary movement about their respective axes, and upon each of these rods is rigidly attached a series of teeth, as K. These teeth are constructed to yield when striking any obstacles to prevent breaking, and in their preferred form comprise the tooth proper a, and a securing section b in the form of a coil, the latter forming a continuation of the tooth, being coiled about the rod and one end rigidly attached to the latter. As thus constructed, each series of teeth depends from the rod to which they are connected, and normally assumes a position at right angles to the ground.

Means are provided,—preferably a cam mechanism,—for rocking each series of teeth successively upon the rotation of the reel into a gathering position, so that as the reel revolves the teeth will lift the vines above the finger bar, permitting the same to be properly severed by the cutter, and will subsequently drop the vines, the mechanism locking the teeth in the desired position for a portion only of the period of the complete rotation of the reel. The means employed consist primarily of a cam L secured to one of the uprights, as D, and a plurality of pins M upon projections O of the bars extending through and beyond the head E, as illustrated.

Adjoining the head E and fixed upon the shaft C of the drum is a suitable sprocket wheel P adapted to be driven by connections with the mowing mechanism (not herein shown), so that as the mower operates the reel is continuously revolved.

In operation, the reel rotates in the direction of the arrow (Fig. 1), and as each series of teeth approaches the ground the pin upon the projecting end of the bar to which the teeth are secured engages the cam, causing the bar or shaft to turn in a direction to bring the teeth into gathering position, and the said teeth are held in this position through the agency of the cam mechanism until they pass beyond the cutter. As the pins then pass out of engagement with the cam, the teeth assume their normal vertical position, thereby dropping the vines after the cutting has been effected.

What I claim as my invention is,—

1. In a harvester, the combination with a finger bar, its shoe and the track clearer, of a pair of uprights respectively carried by said shoe and said track clearer, each terminating in a forked upper end, a diagonal brace for each upright, and a reel journaled in the forked ends for rotary and free vertical movement.

2. In a harvester, the combination with a cutter bar, its shoe and track clearer, of a pair of uprights respectively carried by said shoe and track clearer, each terminating in a forked upper end, diagonal braces for said uprights extending from the latter respectively to the rear of the shoe and track clearer, and a reel journaled in said uprights for free vertical and rotary movement.

3. In a harvester, the combination with the cutter, of a driven wheel operatively associated therewith comprising reel heads, a series of longitudinal bars journaled in the reel heads for free rotary movement, the ends of the bars projecting through and beyond one of the heads, a series of spring teeth upon each bar, uprights carried by the cutter having forked upper ends in which the opposite ends of the reel are journaled, a cam carried by the upright adjacent the projecting bar ends, a pin carried by each of said projecting ends adapted to directly engage the cam as the bar approaches the cutter and remain in engagement with the cam until the passage of the bar beyond the cutter, for the purpose described.

4. In a harvester, the combination with a cutter bar, its shoe and track clearer, of a pair of uprights respectively carried by said shoe and track clearer, each terminating in a forked upper end, a reel shaft journaled in said uprights for rotary and free vertical movement, spaced reel heads upon said shaft, a series of longitudinally-extending bars journaled in said heads and positioned circumferentially about said shaft, the ends of said bars extending outwardly through one of said heads, a series of spring teeth upon each bar, a cam secured to the upright adjacent the projecting bar ends, having one end thereof secured to the body portion and the other end to one of the forks of the upright, a pin extending laterally from each of said projecting ends adapted to directly engage the cam as the bar approaches the cutter and remain in engagement with the cam until the passage of the bar beyond the cutter, for the purpose described.

5. In a harvester, the combination with a cutter bar, its shoe and track clearer, of a pair of uprights respectively carried by said shoe and track clearer, each terminating in a forked upper end, a driven reel comprising spaced heads, a shaft extending centrally and longitudinally of the reel to which said heads are secured for rotary movement journaled in said uprights, a series of longitudinally extending bars journaled in said heads and positioned circumferentially about said shaft, the ends of the bars extending outwardly through one of said heads, a series of spring teeth on said bars, lugs extending laterally from the projecting end of each bar, and a cam secured to one of the uprights, having one end thereof secured to the body portion and the other end to one of the forks of the upright, said cam being adapted to engage the lugs on the bars, for the purpose described.

In testimony whereof I affix my signature in presence of two witnesses.

JOB ESTES.

Witnesses:
 LIZZIE GRIER,
 JOHN MILNE.